Patented Apr. 10, 1945

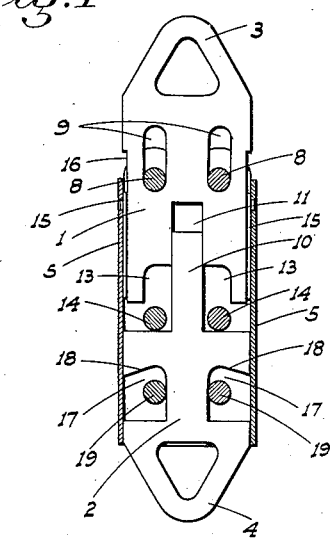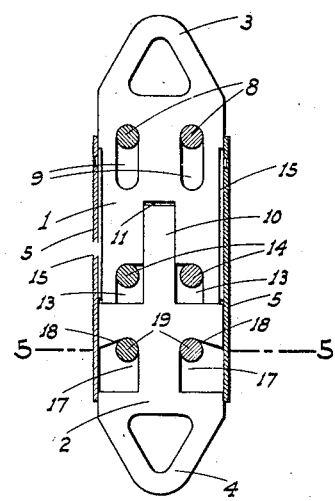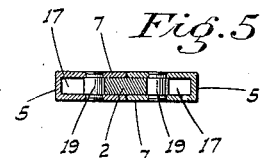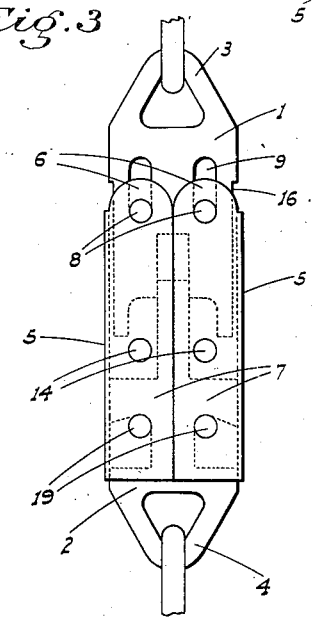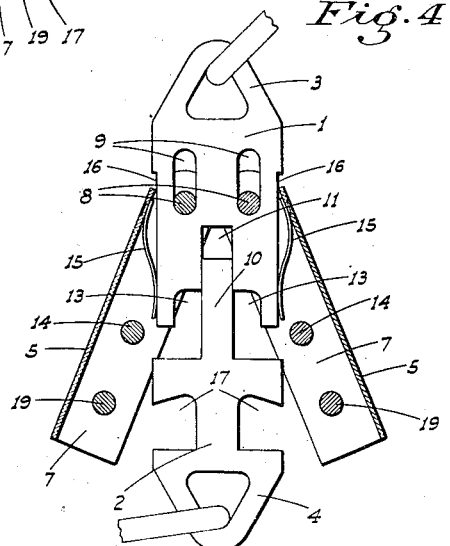

2,373,386

UNITED STATES PATENT OFFICE 2,373,386

PARACHUTE RELEASE

Joseph Lino De Freitas, Fresno, Calif., assignor of one-half to Specialized Engineering Company, Fresno, Calif., a limited partnership composed of Charles G. Connors, W. B. Kyle, and Robert Hoey Application January 1, 1944, Serial No. 516,624

10 Claims. (Cl. 294—83)

This invention relates in general to a parachute release, and in particular the invention is directed to, and it is an object to provide, a connecting device adapted to be interposed between the parachute and the load, and operative upon landing of the load to quickly release the parachute, with attendant advantages. One of such advantages is that the load, after landing, cannot be injured due to the parachute dragging the load over the ground, and which would otherwise occur if windy at the point of landing. The device is adapted for use wherein the load is either a person or a parcel of material, and is especially adapted to military operations which require quick release of the parachute from the load.

A further object of the invention is to provide a parachute release, as above, which includes safety means operative to assure against release of the device prematurely; the device being arranged so that the releasing mechanism cannot function until the load is suspended from the parachute and is subsequently relieved by said load landing on the ground.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a sectional elevation showing the device assembled, but before movement of the locking plate to locked position.

Figure 2 is a sectional elevation of the device assembled and with the locking plate in locked position.

Figure 3 is a side elevation of the device as supporting the load from the parachute; the position of the parts being shown in dotted lines.

Figure 4 is a sectional elevation showing the parts of the device at the moment of release.

Figure 5 is a cross section on line 5—5 of Fig. 2.

Referring now more particularly to the characters of reference on the drawing, the device comprises a pair of flat, elongated plates 1 and 2 having substantially parallel sides and which, when in assembly, are disposed in alined end to end relation; the upper plate 1 being the locking plate, and the lower plate 2 being the release and load supporting plate. The plates 1 and 2 are formed at their outer ends with attachment eyes 3 and 4 respectively; the eye 3 being adapted for attachment to the parachute, while the eye 4 is adapted for attachment to the load.

A pair of open ended, vertically elongated, inwardly facing channels 5 are normally disposed in matching edge to edge engagement, and at their upper ends are formed with upwardly projecting pairs of ears 6 which are extensions of the sides 7 of said channels. Cross pins 8 connect the ears 6 of each pair, and said pins ride in corresponding longitudinally elongated slots 9 cut in the locking plate in spaced, parallel relation.

The plates 1 and 2 are normally in end to end engagement and are straddled and substantially enclosed by the channels 5; the plate 2 having a centrally disposed upstanding pilot finger 10 which slidably engages in a matching, downwardly opening guide-way 11 formed in the plate 1.

On opposite sides of the guide-way 11, and inwardly of the sides of plate 1, the latter is formed with downwardly opening notches 13 corresponding and vertically alined with slots 9. Cross pins 14 are secured between the sides 7 of the channels 5 and seat in said notches 13 when the cross pins 8 are engaged in the upper ends of slots 9.

Leaf springs 15 are fixed in the channels 5 adjacent their upper ends and engage under tension against adjacent side edges of the plate 1, which are relieved as at 16 to receive said springs when the channels are in normal closed position; said springs urging the channels outwardly and tending to rotate the same about cross pins 8 as an axis.

The release plate 2 is formed intermediate its end and on opposite sides with laterally opening notches 17; the upper ends 18 of said notches 17 being disposed at an outward and downward slope in a lateral direction as shown, and for the purpose hereinafter described.

Cross pins 19 connect between the sides 7 of the channels 5 and normally seat in notches 17, and against the ends 18 thereof when pins 8 and 14 are similarly positioned in slots 9 and notches 13 respectively.

To assemble the device the plates 1 and 2 are spaced slightly as shown in Fig. 1, and the channels are closed together, with pins 8 in the lower end of slots 9. At the same time that the channels 5 are closed, the plate 2 is in such position that pins 19 engage in notches 17. Thereafter, the plate 1 is forced downward relative to the channels and until pins 8 engage the upper ends of slots 9, which results in pins 14 riding into notches 13 and locking the channels 5 against outward swinging movement by springs 15, as shown in Fig. 2.

With the parts of the device in the above described positions, the pins 14 positively prevent accidental release of the spring-urged channels and plate 2 cannot escape. The device is thus ready for use and the eye 3 is connected to the parachute and the eye 4 to the load.

As the load drops from the airplane and the parachute opens, the resulting tension shifts plate 1 upwardly until pins 8 are in the bottom of slots 9 and pins 14 are clear of notches 13, as shown in dotted lines in Fig. 3. However, while the tension remains on the device, pins 19 engage and tend to ride inwardly on the sloping ends 18 of notches 17, thus effectively continuing to hold the channels against outward swinging movement.

When the load lands on the ground, the tension on the device is relieved and immediately the springs 15 force the channels to swing outward, clearing pins 19 from notches 17, whereupon plate 2, together with the load, is released from the remainder of the device and the parachute.

From the foregoing description it will be readily seen that I have produced such a device as substantially fulfills the objects of the invention as set forth herein.

While this specification sets forth in detail the present and preferred construction of the device, still in practice such deviations may be resorted to as do not form a departure from the spirit of the invention, as defined by the appended claims.

Having thus described my invention, what I claim as new and useful and desire to secure by Letters Patent is:

1. A parachute release device comprising a pair of initially separate plates disposed in alined end to end relation, and adapted for connection to the parachute and load respectively, a channel normally straddling said plates from one side thereof, means pivoting said channel on one plate for lateral swinging movement to clear the other plate, said other plate having a notch cut therein opening to the side adjacent said channel, a fixed pin intersecting said channel and engaging in the notch, said notch being formed so as to urge the pin inwardly and prevent its escape from the notch when the device is under the tension of the load, and means to swing said channel clear of said other plate and withdraw the pin from the notch upon landing of the load and relief of said tension.

2. A parachute release device comprising a pair of initially separate elements adapted for connection to the parachute and load respectively, a channel normally straddling said plates from one side thereof, means pivoting said channel on one plate for lateral swinging movement to clear the other plate, said other plate having a notch cut therein opening to the side adjacent said channel, a fixed pin intersecting said channel and engaging in the notch, said notch being formed so as to urge the pin inwardly and prevent its escape from the notch when the device is under the tension of the load, and means to swing said channel clear of said other plate and withdraw the pin from the notch upon landing of the load and relief of said tension; said last named means comprising a leaf spring seated in the channel and engaging the adjacent side of said one plate.

3. A parachute release as in claim 1 in which the pin engaging end of said notch is formed at an outward slope in a lateral direction and away from said one plate.

4. A parachute release device comprising a pair of initially separate elements disposed in end to end relation vertically and adapted for connection to the parachute and load respectively, a connector member extending between said elements, means pivoting said connector member adjacent its upper end to the upper element for outward lateral swinging movement and limited relative downward displacement from a normal position, the upper element having a downwardly opening notch in its lower end and the lower element having a notch opening laterally in the direction of swinging movement of said member, cross pins on said member corresponding to and normally engaged in said slots, and means urging the member in said lateral direction; the connector member being downwardly displaced and the corresponding pin released from the notch in said upper element upon the tension of the load being applied to the device, and said notch in the lower element being formed so as to then prevent escape of the corresponding pin therefrom and until said tension is relieved.

5. A parachute release as in claim 4 in which the upper end of the notch in the lower element is formed at a downward and outward slope, whereby said tension on the device causes the corresponding pin to ride into said notch.

6. A parachute release device comprising a pair of initially separate plates disposed in adjacent end to end, vertically alined relation, means at the outer ends of said plates adapted for connection with the parachute and load respectively, a pair of facing channels normally straddling said plates from opposite sides of the latter, means pivoting said channels in connection with the upper plate for outward swinging movement therefrom in opposite lateral directions and for limited relative downward movement from normal position, means tending to swing said channels in said directions, the upper plate having transversely spaced, downwardly opening notches therein and the lower plate having laterally opening notches therein on opposite sides intermediate its ends, and cross pins mounted on said channels corresponding to and normally engaged in said notches; the lower plate and said channels being lowered relative to the upper plate upon the tension of the load being applied to the device, the pins corresponding to said downwardly opening notches being then automatically withdrawn therefrom, and the pins corresponding to said laterally opening slots riding the upper ends of the latter, said ends being arranged to prevent escape of the pins from said lateral notches until said tension is relieved.

7. A parachute release device as in claim 6 in which said channel pivoting means comprises fixed cross pins between opposite sides of said channels; the upper plate having longitudinally extending elongated slots through which said fixed cross pins project; said fixed cross pins normally being disposed in the slots a distance above the bottom thereof sufficient to permit escape of the corresponding cross pins from said downwardly opening notches upon movement of said fixed cross pins to the bottom of said slots.

8. A parachute release device as in claim 6 in which said upper ends of the laterally opening notches in the lower plate slope downwardly and outwardly in a lateral direction.

9. A parachute release device as in claim 6 in which said channel swinging means comprises leaf springs disposed in said channel below the pivoting means and engaging adjacent sides of the upper plate.

10. A parachute release comprising a pair of initially separate elements adapted for connection to the parachute and load respectively, a connector member adapted to extend between said elements, means pivoting the member on one element for outward lateral swinging movement to clear the other element, the member and said other element having flat vertical faces normally disposed in adjacent face-to-face relation and said other element having a laterally opening notch cut therein from one edge of its flat face, said notch opening in the direction of outward swinging movement of said member, a fixed pin on said member releasably projecting from the flat face of said member through said notch transversely, said notch being formed so as to urge the pin inwardly and prevent its escape from the notch when the device is under the tension of the load, and means to swing said member clear of said other element and withdraw the pin from the notch upon landing of the load and relief of said tension.

JOSEPH LINO DE FREITAS.